3,440,065
CELLULOSE-CONTAINING DENTURE ADHESIVE
Anthony Laurence La Via, Milltown, N.J., assignor to E. R. Squibb & Sons, Inc., New York, N.Y., a corporation of Delaware
No Drawing. Filed Dec. 5, 1966, Ser. No. 598,974
Int. Cl. C09j 3/02; A61c 13/22
U.S. Cl. 106—35     4 Claims

ABSTRACT OF THE DISCLOSURE

This invention relates to an improved denture adhesive in which wood flour, microcrystalline cellulose or other tasteless, inert, natural wood pulp derivative in finely powdered form, such as pure alpha-cellulose is incorporated in a gum-petrolatum base.

---

This invention relates to an improved denture adhesive.

A denture adhesive is generally required by denture wearers because of changes in gum structure occurring with time. In order to correct poorly fitting or loose dentures, an adhesive is applied in order to temporarily seal the denture to the mucous membrane of the soft palate and to the gum ridges.

A popular form of denture adhesive comprises a powdered mixture of natural or synthetic gums in a petrolatum base forming a paste-like product. This paste is applied to the moistened denture which is then placed in the mouth. Saliva is relied upon to wet the exposed surface in order that the adhesive may be effected. Both the water first applied to the denture and the saliva act to hydrate the exposed particles of gum and form a mucilage on the contact surface.

Petrolatum, however, is hydrophobic in nature and tends to envelop the particles of gum with an oleaginous barrier, thereby limiting the degree of hydration. In addition, petrolatum acts as a lubricant in contact with mucous membrane, a characteristic which operates at counter purpose to the desired cohesive action.

It has now been found that denture adhesives of the character described may be improved by incorporating in the gum-petrolatum composition wood flour, microcrystalline cellulose or other innocuous, tasteless, inert natural wood pulp derivative in finely powdered form such as pure alpha cellulose. The preferred alpha cellulose fibers consist of naturally occurring celluloses derived from highly purified wood cellulose. Highly purified commercially available wood pulp derivatives are available which contain 99.5% alpha cellulose fibers. Such wood pulp derivatives are preferred.

These cellulose fibers effect a greater degree of hydration of the gum particles, not only on the surface but throughout the paste, and thereby effect a much stronger cohesive bond between the denture and the gingiva and palate.

Insoluble adsorptive cellulosic material which may be incorporated in the compositions according to this invention include wood flour, powdered alpha cellulose or microcystalline cellulose. Any one or a combination of these materials may be incorporated in the composition by admixing with the adhesive agent. About 5 to about 30%, preferably about 10 to 15%, by weight of the wood powder based on the total adhesive agents, will effect the improved results of this invention. In terms of total composition, the wood powder comprises about 1.5 to 20% by weight, preferably 3 to 10%. Best results are obtained with about 4 to 6% by weight.

Such hydrocolloids as guar gum, karaya gum, gum tragacanth, carob gum, alginates, carageenates and their salts, etc. are common gums which may be used in compositions with which this invention is concerned. In addition to gums from natural sources, synthetic gums such as carboxymethyl cellulose (or a metal salt thereof), hydroxy ethyl cellulose, and the like may also be utilized. Generally about 30 to about 60% of the gum (by weight) is made part of the composition. The remainder of the composition comprises petrolatum, e.g., about 35 to about 65%. A portion of the petrolatum may, however, be replaced by mineral oil, e.g., about 5 to about 15%, for the purpose of plasticizing the compositions.

A preferred composition comprises sodium carboxymethylcellulose, about 45 to 50%, mineral oil (optional), about 5 to 10%, petrolatum, about 35 to 40%, wood powder, about 4 to 5%. Karaya gum, in place of the sodium carboxymethylcellulose, constitutes also a preferred modification. Generally, a small amount of flavor oil is also included.

The dry ingredients of the compositions are thoroughly admixed, e.g., by blending in a suitably sized mixing bowl equipped with a gate or paddle type stirrer. These are then added to the previously melted mixture of the petrolatum and mineral oil and the mass is mixed until homogeneous.

While these compositions are most effective as a denture adhesive, it will be appreciated that the compositions may also serve as a vehicle for topical medicaments, especially in the mouth and gum area and similar sites.

The following examples are illustrative of the invention.

Example 1

The following ingredients are used:

| | Grams |
|---|---|
| Sodium carboxymethylcellulose | 47.50 |
| Alpha cellulose (Solka-Floc) | 4.75 |
| Mineral oil | 9.75 |
| Petrolatum | 38.00 |

The sodium carboxymethylcellulose and the alpha cellulose are blended in a mixing bowl. In a separate vessel, the petrolatum and mineral oil are melted together. When the temperature is 60° C., the molten material is transferred to mixing equipment and the powder blend is added. This is mixed until homogeneous.

Example 2

The following ingredients are used:

| | Grams |
|---|---|
| Karaya gum | 45.0 |
| Wood flour | 4.5 |
| Mineral oil | 10.4 |
| Flavor oil (peppermint) | 0.1 |
| Petrolatum | 40.0 |

Following the procedure of Example 1, the powders are blended. The petrolatum is melted together with the mineral oil. When the temperature is at 60° C., the powders are added and mixed until homogeneous. Mixing is continued while cooling and at 30° C. the flavor oil is admixed until homogeneous. The blend, when cool, is then subdivided and packaged, e.g., in jars each containing three grams.

Example 3

The following ingredients are blended and packaged following the procedure of Example 2:

| | Grams |
|---|---|
| Sodium carboxymethylcellulose | 30.00 |
| Guar gum | 15.00 |
| Alpha cellulose (Solka-Floc) | 7.5 |
| Mineral oil | 15.00 |
| Oil of peppermint | 0.1 |
| Petrolatum | 32.4 |

Example 4

The procedure of Example 2 is followed utilizing the following ingredients:

| | Grams |
|---|---|
| Karaya gum | 500 |
| Microcrystalline cellulose | 50 |
| Mineral oil | 130 |
| Petrolatum | 320 |

Example 5

The procedure of Example 2 is followed utilizing the following ingredients:

| | Grams |
|---|---|
| Hydroxyethyl cellulose | 220 |
| Karaya gum | 220 |
| Wood flour | 60 |
| Mineral oil | 100 |
| Petrolatum | 400 |

Example 6

The procedure of Example 2 is followed utilizing the following ingredients:

| | Grams |
|---|---|
| Tragacanth | 16.00 |
| Guar gum | 16.00 |
| Karaya gum | 16.00 |
| Alpha cellulose (Solka-Floc) | 4.85 |
| Oil of sassafras | 0.15 |
| Mineral oil | 10.0 |
| Petrolatum | 37.0 |

What is claimed is:

1. An adhesive composition comprising about 30 to about 60% of topically acceptable adhesive hydrocolloid, about 1.5 to 20% by weight of powdered insoluble absorptive cellulose material and about 35 to about 65% petrolatum.

2. A composition as in claim 1 wherein the hydrocolloid is sodium carboxymethylcellulose, hydroxyethylcellulose, karaya gum, guar gum, tragacanth, or mixtures thereof and the cellulose material is alpha cellulose, wood flour or microcrystalline cellulose.

3. A denture adhesive comprising, on a weight basis, about 45 to 50% of sodium carboxymethylcellulose, about 4 to 5% of alpha cellulose and about 35 to 40% of petrolatum.

4. A composition as in claim 3 including about 5 to 10% mineral oil.

References Cited

UNITED STATES PATENTS

| | | |
|---|---|---|
| 1,947,438 | 2/1934 | Walsh. |
| 2,574,476 | 11/1951 | Heath et al. 106—35 |
| 3,003,988 | 10/1961 | Germann et al. 106—35 |

ALLAN LIEBERMAN, *Primary Examiner.*

U.S. Cl. X.R.

106—191, 193, 207, 208, 209; 167—58, 60; 424—361, 362